United States Patent
Sugawara

(10) Patent No.: US 9,264,636 B2
(45) Date of Patent: Feb. 16, 2016

(54) IMAGING DEVICE AND SIGNAL CORRECTING METHOD

(71) Applicant: FUJIFILM Corporation, Tokyo (JP)

(72) Inventor: Kazufumi Sugawara, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/535,908

(22) Filed: Nov. 7, 2014

(65) Prior Publication Data

US 2015/0062386 A1     Mar. 5, 2015

Related U.S. Application Data

(63) Continuation of application No. PCT/JP2013/060736, filed on Apr. 9, 2013.

(30) Foreign Application Priority Data

May 10, 2012  (JP) .................................. 2012-108559
Nov. 15, 2012 (JP) .................................. 2012-251565

(51) Int. Cl.
| | |
|---|---|
| H04N 5/217 | (2011.01) |
| H04N 5/357 | (2011.01) |
| G02B 7/34  | (2006.01) |
| H04N 5/243 | (2006.01) |
| H04N 5/232 | (2006.01) |
| G03B 13/36 | (2006.01) |
| G02B 7/28  | (2006.01) |

(52) U.S. Cl.
CPC .............. *H04N 5/3572* (2013.01); *G02B 7/34* (2013.01); *H04N 5/23212* (2013.01); *H04N 5/243* (2013.01); *G02B 7/282* (2013.01); *G03B 13/36* (2013.01)

(58) Field of Classification Search
CPC .... H04N 5/3572; H04N 5/3696; G06T 5/002; G06T 5/005; G06T 5/006; G06K 9/40
USPC .............. 348/222.1, 241–251, 340, 345–356; 382/274, 275
See application file for complete search history.

(56) References Cited

U.S. PATENT DOCUMENTS

| | | | | |
|---|---|---|---|---|
| 9,118,828 | B2 * | 8/2015 | Okazawa ........... | H04N 5/23212 |
| 2005/0093992 | A1 * | 5/2005 | Fukumoto .............. | G06T 7/408 348/222.1 |
| 2010/0214452 | A1 * | 8/2010 | Kawarada .............. | G02B 7/346 348/255 |
| 2011/0109775 | A1 * | 5/2011 | Amano .............. | H04N 5/23212 348/241 |
| 2013/0329132 | A1 * | 12/2013 | Tico ......................... | H04N 5/14 348/571 |

FOREIGN PATENT DOCUMENTS

| | | | |
|---|---|---|---|
| JP | 2006-184321 | A | 7/2006 |
| JP | 2008-242333 | A | 10/2008 |
| JP | 2010-62640 | A | 3/2010 |
| JP | 2013125046 | A | 6/2013 |

OTHER PUBLICATIONS

International Search Report, issued in PCT/JP2013/060736, dated Jul. 16, 2013.
Written Opinion of the International Searching Authority, issued in PCT/JP2013/060736, dated Jul. 16, 2013.

* cited by examiner

*Primary Examiner* — Nhan T Tran
*Assistant Examiner* — Chriss Yoder, III
(74) *Attorney, Agent, or Firm* — Birch, Stewart, Kolasch & Birch, LLP

(57) ABSTRACT

A digital signal processing unit 17 of a digital camera which includes a solid-state imaging element 5 having an imaging pixel cell 30 and a pair of focus detecting pixel cells 31R and 31L determines whether a captured image signal obtained by imaging by the imaging element 5 has a region affected by at least one of the flare and the ghost. And, when it is determined that there is the region, the digital signal processing unit 17 performs correction processing by signal interpolation using an output signal of imaging pixel cells around the focus detecting pixel cell included in the captured image signal on an output signal of all the focus detecting pixel cells included in the captured image signal.

10 Claims, 13 Drawing Sheets

FIG. 8

DIFFERENCE OF GAIN VALUE BETWEEN ADJACENT BLOCKS
AT LEFT AND RIGHT (NO UNNECESSARY LIGHT)

|    | 3L-2L | 2L-1L | 1L-1R | 1R-2R | 2R-3R |
|----|-------|-------|-------|-------|-------|
| 3U | 13    | 11    | 15    | 18    | 11    |
| 2U | 14    | 10    | 16    | 15    | 12    |
| 1U | 16    | 13    | 9     | 16    | 8     |
| 1B | 22    | 7     | 8     | 11    | 19    |
| 2B | 9     | 9     | 9     | 11    | 18    |
| 3B | 14    | 8     | 8     | 16    | 17    |

FIG. 9

DIFFERENCE OF GAIN VALUE BETWEEN ADJACENT BLOCKS
AT LEFT AND RIGHT (UNNECESSARY LIGHT EXISTS)

|    | 3L-2L | 2L-1L | 1L-1R | 1R-2R | 2R-3R |
|----|-------|-------|-------|-------|-------|
| 3U | -3    | 36    | 76    | 135   | 243   |
| 2U | -58   | 2     | 61    | 134   | 245   |
| 1U | -67   | -13   | 46    | 106   | 205   |
| 1B | -66   | 1     | 41    | 89    | 125   |
| 2B | 11    | 57    | 51    | 79    | 103   |
| 3B | 39    | 44    | 60    | 121   | 173   |

FIG. 12A

GAIN TABLE (CAPTURED IMAGE)

|  | 3L | 2L | 1L | 1R | 2R | 3R |
|---|---|---|---|---|---|---|
| GAIN VALUE | 350 | 480 | 700 | 780 | 850 | 890 |

FIG. 12B

GAIN TABLE (REFERENCE IMAGE)

|  | 3L | 2L | 1L | 1R | 2R | 3R |
|---|---|---|---|---|---|---|
| GAIN VALUE | 400 | 500 | 680 | 760 | 840 | 900 |

FIG. 12C

GAIN TABLE (CAPTURED IMAGE - REFERENCE IMAGE)

|  | 3L | 2L | 1L | 1R | 2R | 3R |
|---|---|---|---|---|---|---|
| GAIN VALUE | -50 | -20 | 20 | 20 | 10 | -10 |

FIG. 12D

|  | 3L-2L | 2L-1L | 1L-1R | 1R-2R | 2R-3R |
|---|---|---|---|---|---|
| GAIN DIFFERENCE BETWEEN ADJACENT BLOCKS | 30 | 40 | 0 | -10 | -20 |

FIG. 13A

GAIN TABLE (CAPTURED IMAGE)

|    | 3L  | 2L  | 1L  | 1R  | 2R  | 3R  |
|----|-----|-----|-----|-----|-----|-----|
| 3U | 300 | 400 | 500 | 600 | 700 | 800 |
| 2U | 300 | 450 | 500 | 600 | 700 | 800 |
| 1U | 400 | 800 | 700 | 600 | 700 | 800 |
| 1B | 300 | 450 | 500 | 600 | 700 | 800 |
| 2B | 300 | 400 | 500 | 600 | 700 | 800 |
| 3B | 300 | 400 | 500 | 600 | 700 | 800 |

FIG. 13B

GAIN AVERAGE OF UPPER AND LOWER BLOCKS − GAIN VALUE OF BLOCK

|    | 3L  | 2L  | 1L  | 1R | 2R | 3R |
|----|-----|-----|-----|----|----|----|
| 3U | 0   | 50  | 0   | 0  | 0  | 0  |
| 2U | 50  | 200 | 100 | 0  | 0  | 0  |
| 1U | 100 | 350 | 200 | 0  | 0  | 0  |
| 1B | 50  | 200 | 100 | 0  | 0  | 0  |
| 2B | 0   | 25  | 0   | 0  | 0  | 0  |
| 3B | 0   | 0   | 0   | 0  | 0  | 0  |

FIG. 14A

GAIN TABLE (CAPTURED IMAGE)

|    | 3L  | 2L  | 1L  | 1R  | 2R  | 3R  |
|----|-----|-----|-----|-----|-----|-----|
| 3U | 300 | 400 | 500 | 600 | 700 | 800 |
| 2U | 300 | 450 | 500 | 600 | 700 | 800 |
| 1U | 400 | 800 | 700 | 600 | 700 | 800 |
| 1B | 300 | 450 | 500 | 600 | 700 | 800 |
| 2B | 300 | 400 | 500 | 600 | 700 | 800 |
| 3B | 300 | 400 | 500 | 600 | 700 | 800 |

FIG. 14B

GAIN TABLE (REFERENCE IMAGE)

|    | 3L  | 2L  | L   | R   | 2R  | 3R  |
|----|-----|-----|-----|-----|-----|-----|
| 3U | 300 | 400 | 500 | 600 | 700 | 800 |
| 2U | 300 | 400 | 500 | 600 | 700 | 800 |
| 1U | 300 | 400 | 500 | 600 | 700 | 800 |
| 1B | 300 | 400 | 500 | 600 | 700 | 800 |
| 2B | 300 | 400 | 500 | 600 | 700 | 800 |
| 3B | 300 | 400 | 500 | 600 | 700 | 800 |

FIG. 14C

GAIN TABLE (CAPTURED IMAGE - REFERENCE IMAGE)

|    | 3L  | 2L  | 1L  | 1R | 2R | 3R |
|----|-----|-----|-----|----|----|----|
| 3U | 0   | 0   | 0   | 0  | 0  | 0  |
| 2U | 0   | 50  | 0   | 0  | 0  | 0  |
| 1U | 100 | 400 | 200 | 0  | 0  | 0  |
| 1B | 0   | 50  | 0   | 0  | 0  | 0  |
| 2B | 0   | 0   | 0   | 0  | 0  | 0  |
| 3B | 0   | 0   | 0   | 0  | 0  | 0  |

IMAGING DEVICE AND SIGNAL CORRECTING METHOD

CROSS REFERENCE TO RELATED APPLICATION

This is a continuation of International Application No. PCT/JP2013/060736 filed on Apr. 9, 2013, and claims priority from Japanese Patent Application Nos. 2012-108559, filed on May 10, 2012, and 2012-251565, filed on Nov. 15, 2012, the entire disclosures of which are incorporated herein by reference.

BACKGROUND

1. Technical Field

The present invention relates to an imaging device and a signal correcting method.

2. Related Art

Recently, as the resolution of a solid-state imaging element such as a charge coupled device (CCD) image sensor and a complementary metal oxide semiconductor (CMOS) image sensor becomes higher, a demand for an information equipment having an imaging function such as a digital still camera, a digital video camera, a cellular phone, and a personal digital assistant (PDA) is rapidly increasing. In the meantime, the information device having an imaging function as described above is referred to as an imaging device.

However, a focus control method which adjusts a focus on a main subject by detecting a distance to a major subject includes a contrast auto focus (AF) method and a phase difference AF method. Since the phase difference AF method may detect a focusing position with high precision at a high speed as compared with the contrast AF method, the phase difference AF method is widely employed in various imaging devices.

As a solid-state imaging element which is mounted in an imaging device which controls a focus by a phase difference AF method, a solid-state imaging element in which a pair of focus detecting pixel cells having openings of a light shielding layer, which are off-centered in reverse directions to each other, are discretely provided on an entire surface of an imaging region is used (see Patent Literature 1 (JP-A-2010-62640)).

An area of the opening of the light shielding layer of the focus detecting pixel cell is smaller than those of other normal pixel cells, and as a result, it is insufficient to use the output signal as an imaging signal. Therefore, it is required to correct the output signal of the focus detecting pixel cell.

Patent Literature 1 discloses a method that selectively performs interpolation correction processing which interpolates and creates an output signal of a focus detecting pixel cell using an output signal of a normal pixel cell therearound and gain correction processing which corrects the output signal of the focus detecting pixel cell by amplifying a gain in accordance with variation of the output signal of the normal pixel cell around the focus detecting pixel cell.

In the imaging device disclosed in Patent Literature 1, when there is a strong light source within or near an imaging range, ghost or flare may be undesirably generated by the reflection on a surface of a lens which configures the optical system or a surface of a chip of a solid-state imaging element. When the light which generates the ghost or the flare is incident onto a focus detecting pixel cell, a defocus amount may not be calculated with high precision, that is, the focus may not be controlled.

A technology which prevents the phase difference AF precision from being deteriorated due to light which generates the ghost or flare is disclosed in Patent Literature 2 (JP-A-2008-242333) and Patent Literature 3 (JP-A-2006-184321).

Patent Literature 2 discloses a method which determines whether the ghost or flare is generated and corrects an output signal of the focus detecting pixel cell when it is determined that the ghost or flare is generated to improve the phase difference AF precision.

Patent Literature 3 discloses a method which detects a position and light amount of a photographing light source from an output of a solid-state imaging element and calculates a correction value from information on the position and the light amount of the photographing light source and information on light which generates a ghost or a flare in accordance with a position of a photographing light source which has been stored in a storing unit in advance to correct a light amount distribution for an image of a subject output from the solid-state imaging element using the correction value, thereby improving the phase difference AF precision.

SUMMARY OF INVENTION

The above-described gain correction processing corrects the output signal in such a way that a gain for reducing a difference between the sensitivity of a focus detecting pixel cell and the sensitivity of a normal pixel cell therearound is multiplied with the output signal of the focus detecting pixel cell.

Therefore, when the difference between the sensitivity of the focus detecting pixel cell and the sensitivity of a normal pixel cell therearound is large, a large gain as much as the difference needs to be multiplied with the output signal of the focus detecting pixel cell. When the large gain is multiplied with the output signal of the focus detecting pixel cell, a noise included in the output signal is increased so that a correction error is increased.

When the ghost or flare is generated, in a region where the ghost or the flare is generated, the difference between the sensitivity of the focus detecting pixel cell and the sensitivity of a normal pixel cell therearound is larger than that in the region where no ghost or flare is generated. Therefore, for example, when the gain correction processing is performed on all the focus detecting pixel cells, a region having a large correction error and a region having a small correction error coexist in the entire image so that an image quality is likely to be lowered.

That is, when the ghost or the flare is generated, how much the difference between the correction error in the region where the ghost or the flare is generated and the correction error in the region where no ghost or flare is generated is reduced may be important to improve the image quality.

In Patent Literature 1, the correction method is determined by a variation of the output signals of the normal pixel cell around the focus detecting pixel cell but improvement of the deteriorated image quality due to generation of the ghost or the flare is not considered.

In Patent Literatures 2 and 3, even though the output signal of the focus detecting pixel cell is corrected depending on presence of the ghost or the flare, the output signal is corrected only for the phase difference AF, but how to use the output signal of the focus detecting pixel cell as a captured image signal is not disclosed.

In view of above, illustrative aspects of the present invention are to provide an imaging device and a signal correcting method which do not deteriorate the quality of a captured image obtained by an imaging element including a focus detecting pixel cell and an imaging pixel cell even when a ghost or a flare is generated.

An aspect of the present invention provides an imaging device including an imaging element which includes a plurality of first pixel cells for imaging and a plurality of pairs configured by plural types of second pixel cells for focus detection which receive light passing through different pupil regions of a photographing lens, the device including: a determining unit which determines whether a captured image signal is affected by at least one of a flare and a ghost using the captured image signal obtained by imaging by the solid-state imaging element; a correction processing unit which performs one of interpolation correction processing and gain correction processing on an output signal of the second pixel cell included in the captured image signal, where the interpolation correction processing corrects the output signal of the second pixel cell by signal interpolation using an output signal of the plurality of first pixel cells around the second pixel included in the captured image signal, and the gain correction processing corrects the output signal of the second pixel cell by multiplying the output signal with a gain value; and an image data generating unit which processes the captured image signal after the correction processing by the correction processing unit to generate captured image data, in which the correction processing unit determines as to whether which one of the interpolation correction processing and the gain correction processing is to be performed on the output signal of the second pixel cell on the basis of a determination result by the determining unit.

Another aspect of the present invention provides a signal correcting method which corrects a captured image signal output from an imaging element including a plurality of first pixel cells for imaging and a plurality of pairs configured by plural types of second pixel cells for focus detection which receive light passing through different pupil regions of a photographing lens which are two dimensionally arranged, the method including: a determining step which determines whether a captured image signal is affected by at least one of a flare and a ghost using the captured image signal obtained by imaging by the solid-state imaging element; a correction processing step which performs one of interpolation correction processing and gain correction processing on an output signal of the second pixel cell included in the captured image signal, where the interpolation correction processing corrects the output signal of the second pixel cell by signal interpolation using an output signal of the plurality of first pixel cells around the second pixel included in the captured image signal, and the gain correction processing corrects the output signal of the second pixel cell by multiplying the output signal with a gain value; and an image data generating step which processes the captured image signal after the correction processing by the correction processing step to generate captured image data, in which the correction processing step, it is determined as to whether which one of the interpolation correction processing and the gain correction processing is to be performed on the output signal of the second pixel cell on the basis of a determination result by the determining step.

With the aspects of the present invention, an imaging device and a signal correcting method which do not deteriorate the quality of a captured image obtained by an imaging element including a focus detecting pixel cell and an imaging pixel cell even when a ghost or a flare is generated are provided.

BRIEF DESCRIPTION OF DRAWINGS

FIG. 8 is a view illustrating an example of a gain table generated by the digital signal processing unit 17 illustrated in FIG. 1.

FIG. 9 is a view illustrating an example of a gain table generated by the digital signal processing unit 17 illustrated in FIG. 1.

FIGS. 12A to 12D are views for explaining a modified example of processing contents of the digital signal processing unit 17 illustrated in FIG. 1.

FIGS. 13A and 13B are views for explaining a modified example of processing contents of the digital signal processing unit 17 illustrated in FIG. 1.

FIGS. 14A to 14C are view for explaining a modified example of processing contents of the digital signal processing unit 17 illustrated in FIG. 1.

DESCRIPTION OF EMBODIMENTS

Hereinafter, an embodiment of the present invention will be described with reference to the drawings.

Figure 1:
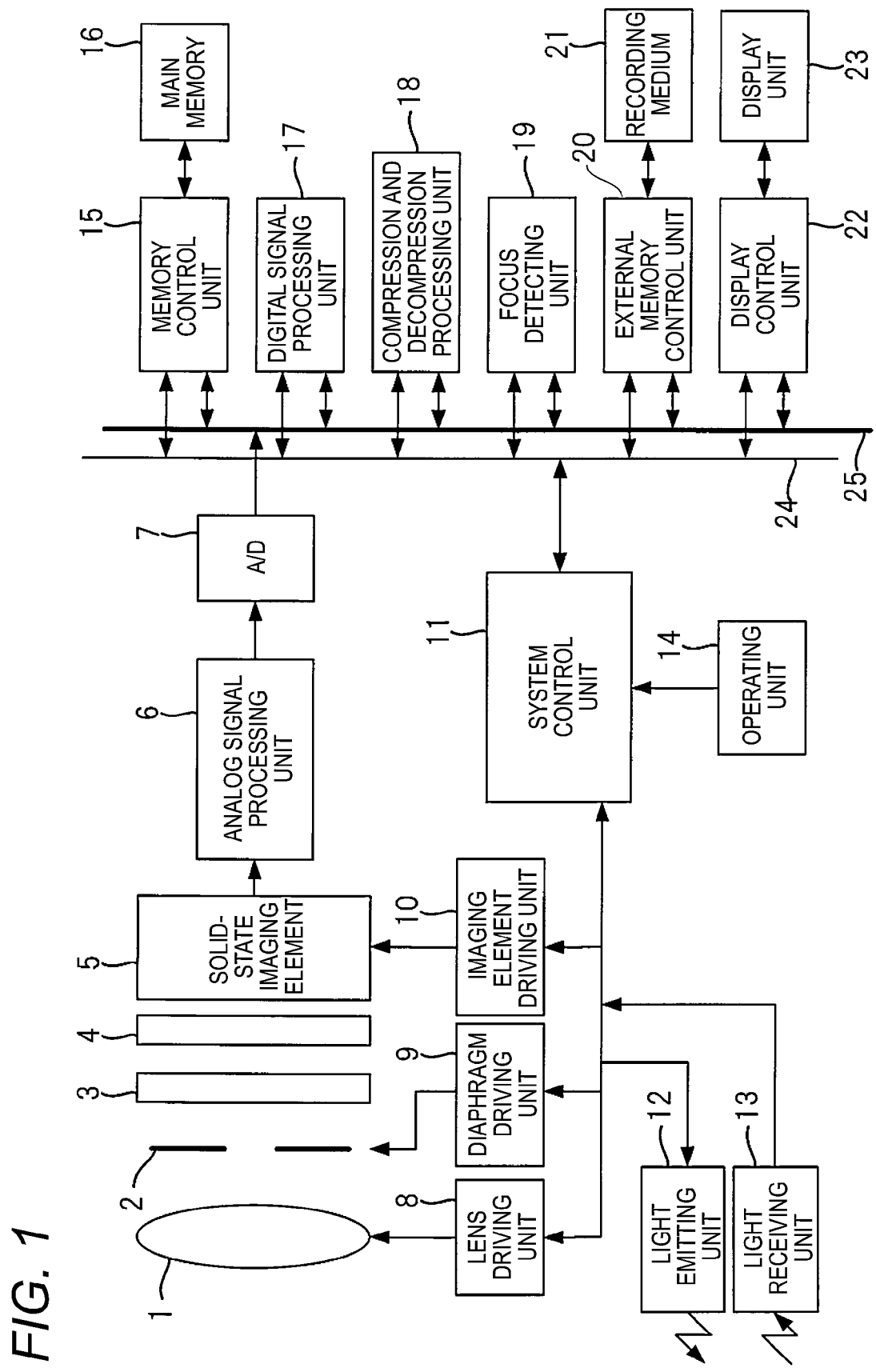
FIG. 1 is a diagram illustrating a schematic configuration of a digital camera as an example of an imaging device for explaining an embodiment of the present invention.

FIG. 1 is a diagram illustrating a schematic configuration of a digital camera as an example of an imaging device for explaining an embodiment of the present invention.

An imaging system of a digital camera illustrated in FIG. 1 includes a photographing optical system having a photographing lens 1 including a lens such as a focus lens or a zoom lens and a diaphragm 2, a solid-state imaging element 5 such as a CCD image sensor or a CMOS image sensor, an infrared cut filter (IRCUT) 3 and an optical low pass filter (OLPF) 4 which are provided between the photographing optical system and the solid-state imaging element 5.

The solid-state imaging element 5 is configured such that a plurality of imaging pixel cells and two types of focus detecting pixel cells which receive a pair of light fluxes passing through different pupil regions of the photographing optical system are two dimensionally arranged and receives an image which is formed by the photographing lens 1 to output a captured image signal and also output a pair of focus detecting signals corresponding to the pair of light fluxes.

A system control unit 11 which collectively controls an entire electrical control system of the digital camera controls a flash light emitting unit 12 and a light receiving unit 13. Further, the system control unit 11 controls a lens driving unit 8 to adjust a position of a focus lens which is included in the photographing lens 1 or a position of the zoom lens which is included in the photographing lens 1. Further, the system control unit 11 controls an aperture size of the diaphragm 2 through a diaphragm driving unit 9 so as to adjust an exposure amount.

The system control unit 11 drives the solid-state imaging element 5 through an imaging element driving unit 10 and outputs a subject image captured through the photographing lens 1 as a captured image signal. An instruction signal from a user is input to the system control unit 11 through an operating unit 14.

The electrical control system of the digital camera further includes an analog signal processing unit 6 connected to an output of the solid-state imaging element 5 to perform analog signal processing such as correlated double sampling processing and an A/D converting circuit 7 which converts a RGB color signal output from the analog signal processing unit 6 into a digital signal. The analog signal processing unit 6 and the A/D converting circuit 7 are controlled by the system control unit 11.

The electrical control system of the digital camera includes a main memory 16, a memory control unit 15 connected to the main memory 16, a digital signal processing unit 17 which performs various imaging processing on the captured image signal obtained through imaging by the solid-state imaging element 5 to generate photographed image data, a compression and decompression processing unit 18 which compresses the photographed image data generated in the digital signal processing unit 17 in a JPEG format or decompresses the compressed image data, a focus detecting unit 19 which calculates a defocus amount of the photographing lens 1 based on a phase difference of a pair of focus detection signals output from the focus detecting pixel cells of the solid-state imaging element 5, an external memory control unit 20 to which a detachable recording medium 21 is connected, and a display control unit 22 to which a display unit 23 mounted on a rear surface of a camera is connected. The memory control unit 15, the digital signal processing unit 17, the compression and decompression processing unit 18, the focus detecting unit 19, the external memory control unit 20, and the display control unit 22 are connected to each other by a control bus 24 and a data bus 25 to be controlled by a command from the system control unit 11.

Figure 2:
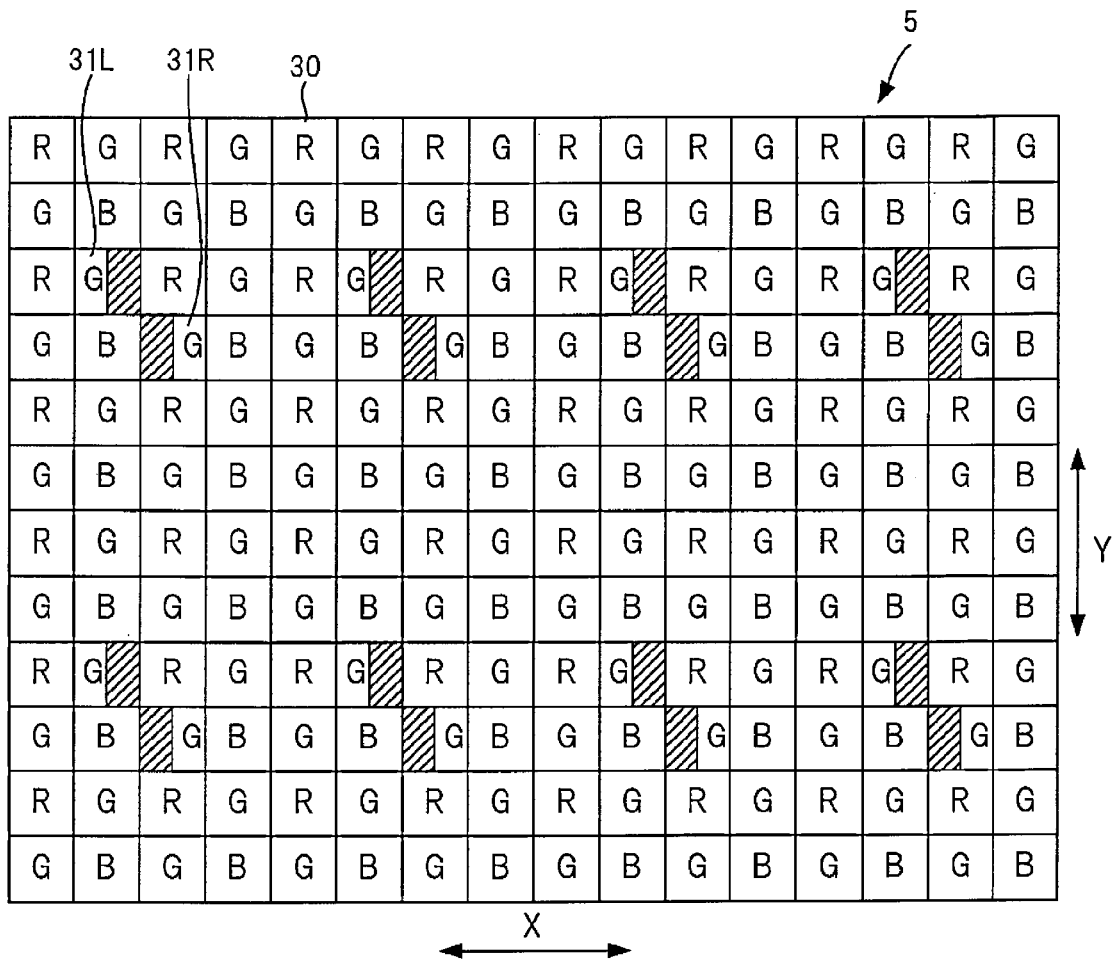
FIG. 2 is a schematic plan view illustrating a schematic configuration of a solid-state imaging element 5 which is mounted in the digital camera illustrated in FIG. 1.

FIG. 2 is a schematic plan view illustrating a schematic configuration of a solid-state imaging element 5 which is mounted in the digital camera illustrated in FIG. 1. FIG. 2 is a view of the solid-state imaging element 5 seen from the subject. In the solid-state imaging element 5, the focus detecting pixel cells are formed so as to be scattered in an entire surface or a part of an imaging region where the pixel cells are two dimensionally arranged. FIG. 2 illustrates an enlarged view of a part of the imaging region where the focus detecting pixel cells are provided.

The solid-state imaging element 5 includes a plurality of pixel cells 51 (square shapes in the drawing) which is two-dimensionally (in a square lattice shape in an example of FIG. 2) arranged in a row direction X and a column direction Y orthogonal to the row direction. The plurality of pixel cells is formed such that pixel cell rows including a plurality of pixel cells which are arranged in parallel in the row direction X at a constant pitch are arranged in parallel in the column direction Y at a constant pitch. The plurality of pixel cells includes an imaging pixel cell 30, a focus detecting pixel cell 31L, and a focus detecting pixel cell 31R. Each pixel cell includes a photoelectric converting unit which receives light and converts the light into a charge.

The imaging pixel cell 30 is a pixel cell which receives both a pair of light components (for example, a light component passing through a left side with respect to a major axis of the photographing lens 1 and a light component passing through a right side) which pass through different pupil regions of the photographing lens 1 illustrated in FIG. 1.

The focus detecting pixel cell 31L is a pixel cell which receives one of the pair of light components and has a configuration in which an opening (a region which is not hatched) of a photoelectric converting unit is off-centered to the left side as compared with the imaging pixel cell 30.

The focus detecting pixel cell 31R is a pixel cell which receives the other one of the pair of light components and has a configuration in which an opening (a region which is not hatched) of the photoelectric converting unit is off-centered to the right side as compared with the imaging pixel cell 30.

However, the configuration of the focus detecting pixel cells is not limited as described above, but a known configuration may be employed. Further, here, a pair of image signals having a phase difference in a row direction X is detected by a focus detecting pixel cell 31R and a focus detecting pixel cell 31L, but a pair of image signals having a phase difference in a column direction Y may be detected while considering an off-centered direction of the opening of the light shielding layer as a column direction Y.

A color filter is mounted above the photoelectric converting unit which is included in each pixel cell and the arrangement of the color filters is in a Beyer arrangement for all of the plurality of pixel cells which configures the solid-state imaging element 5.

In FIG. 2, "R" denotes a pixel cell in which a color filter which transmits a red (R) light component is mounted. Further, "G" denotes a pixel cell in which a color filter which transmits a green (G) light component is mounted. Furthermore, "B" denotes a pixel cell in which a color filter which transmits a blue (B) light component is mounted. In the example of FIG. 2, even though the color filter is mounted in the solid-state imaging element 5, the color filter may not be mounted.

A micro lens is provided above a photoelectric converting unit which is included in each pixel cell (above the color filter when the color filter is provided) to collect light onto the photoelectric converting unit.

An arrangement position of the micro lens is scaled in order to align sensitivities of imaging pixel cells or sensitivities of the focus detecting pixel cells in the entire solid-state imaging element 5.

The scaling of the arrangement position means that in order to efficiently collect light which enters in an oblique direction, a center position of the micro lens included in each of the pixel cells is off-centered toward the center of the solid-state imaging element 5 from the center position of the pixel cell as it is directed from the center of the solid-state imaging element 5 to the edge and the off-centered amount is increased from the center of the solid-state imaging element 5 to the edge.

The focus detecting pixel cells 31L are arranged in a position of the pixel cell on which the color filter which transmits the green G light component is mounted at three pixel cell intervals, in third and ninth pixel cell rows from the top of FIG. 2.

The focus detecting pixel cells 31R are arranged in a position of the pixel cell on which the color filter which transmits the green G light component is mounted at three pixel cell intervals, in fourth and tenth pixel cell rows from the top of FIG. 2.

The focus detecting pixel cell 31L and the focus detecting pixel cell 31R which are adjacent to each other in an oblique direction form a pair and the solid-state imaging element 5 has a configuration in which a plurality of pairs is formed.

The focus detecting unit 19 illustrated in FIG. 1 calculates a focus adjustment state of the photographing lens 1 which is an off-centered amount from the focused state and a direction thereof in this case, that is, a defocused amount using a signal group read out from the focus detecting pixel cell 31L and the focus detecting pixel cell 31R.

The system control unit 11 illustrated in FIG. 1 controls a position of a focus lens which is included in the photographing lens 1 based on the defocused amount calculated by the focus detecting unit 19 to adjust a focus.

When a photographing instruction is issued in a state where the focus is adjusted, the system control unit 11 causes the solid-state imaging element 5 to capture an image, and the captured image signal (a set of output signals output from each pixel cell) output from the solid-state imaging element 5 by the imaging operation is received by the digital signal processing unit 17. In addition, the digital signal processing unit 17 corrects the output signal of the focus detecting pixel cell included in the captured image signal and processes the captured image signal after being corrected to generate captured image data.

The digital signal processing unit 17 performs any one of interpolation correction processing which corrects an output signal of the focus detecting pixel cell by interpolating a signal using the output signal of an imaging pixel cell around the focus detecting pixel cells and gain correction processing which multiplies the output signal of the focus detecting pixel cell by a gain and amplifies the multiplied value to correct the output signal of the focus detecting pixel cell, on the focus detecting pixel cell.

Figure 3:
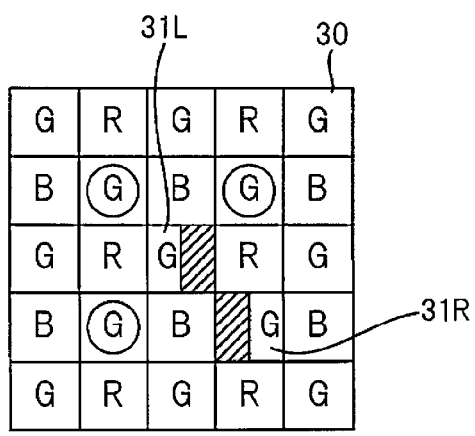
FIG. 3 is a view obtained by extracting five by five pixel cells with a focus detecting pixel cell 31L at a center in the solid-state imaging element 5 illustrated in FIG. 2.

FIG. 3 is a view obtained by extracting five by five pixel cells with a focus detecting pixel cell 31L at a center in the solid-stage imaging element 5 illustrated in FIG. 2.

When the focus detecting pixel cell 31L illustrated in FIG. 3 is corrected by the interpolation correction processing, the digital signal processing unit 17 substitutes an output signal obtained by averaging the output signals of the imaging pixel cells 30 enclosed by circles which detects the light having the same color as the focus detecting pixel cell 31L around the focus detecting pixel cell 31L with the output signal of the focus detecting pixel cell 31L.

When the focus detecting pixel cell 31L illustrated in FIG. 3 is corrected by the gain correction processing, for example, the digital signal processing unit 17 calculates a gain which approximates the average value of the output signals of the imaging pixel cells 30 enclosed by circles which detects the light having the same color as the focus detecting pixel cell 31L around the focus detecting pixel cell 31L to the output signal of the focus detecting pixel cell 31L to multiply the gain by the output signal of the focus detecting pixel cell 31L.

The digital signal processing unit 17 determines whether the captured image signal has a region which is affected by light which is not necessary (noise) in the image such as the ghost or the flare in the captured image signal by using the captured image signal. Further, the digital signal processing unit 17 determines any one of the interpolation correction processing and the gain correction processing as correction processing which will be performed on the focus detecting pixel cell, based on a determination result.

Figure 4:
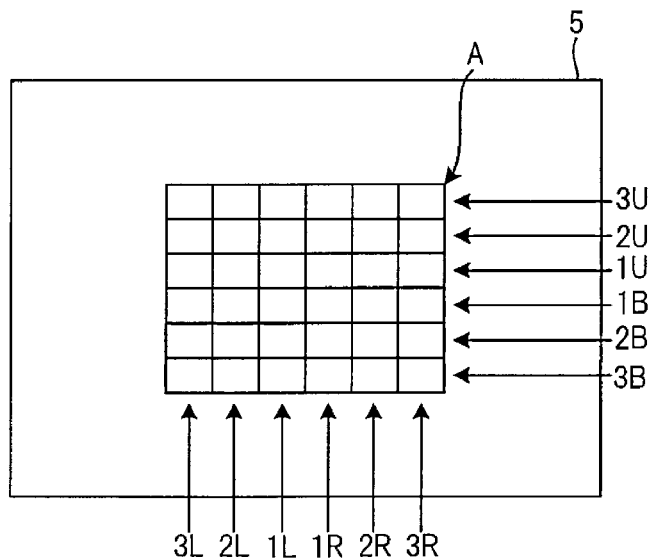
FIG. 4 is a schematic plan view illustrating a solid-state imaging element 5 in the digital camera illustrated in FIG. 1.

FIG. 4 is a schematic plan view illustrating an overall configuration of the solid-state imaging element 5 illustrated in FIG. 1. The focus detecting pixel cell illustrated in FIG. 2 is discretely provided in a region A which is located at a center of the solid-state imaging element 5. In the other regions than the region A, only the imaging pixel cells 30 are arranged.

In the example of FIG. 4, the region A is divided into six by six blocks. In FIG. 4, the region A is divided into six rows (in the order of 3L, 2L, 1L, 1R, 2R, and 3R from the left) and six columns (in the order of 3U, 2U, 1U, 1B, 2B, and 3B from the top) and one block is provided at an intersection of each of the rows and each of the columns.

The digital signal processing unit 17 uses the captured image signal to calculate a gain value which is used to correct the output signal of the focus detecting pixel cell included in the captured image signal by the gain correction processing.

For example, the digital signal processing unit 17 calculates an average value AvS of the output signals of the imaging pixel cell 30 in an arbitrary block of FIG. 4 and an average value AvL of the output signals of the focus detecting pixel cell 31L in the block to calculate AvS/AvL as a gain value corresponding to the focus detecting pixel cell 31L in the block.

Similarly, the digital signal processing unit 17 calculates an average value AvS of the output signals of the imaging pixel cell 30 in an arbitrary block of FIG. 4 and an average value AvR of the output signals of the focus detecting pixel cell 31R in the block to calculate AvS/AvR as a gain value corresponding to the focus detecting pixel cell 31R in the block.

By the arithmetic operation, a gain table in which the gain values AvS/AvL and AvS/AvR are associated with individual blocks is generated.

Figure 5:
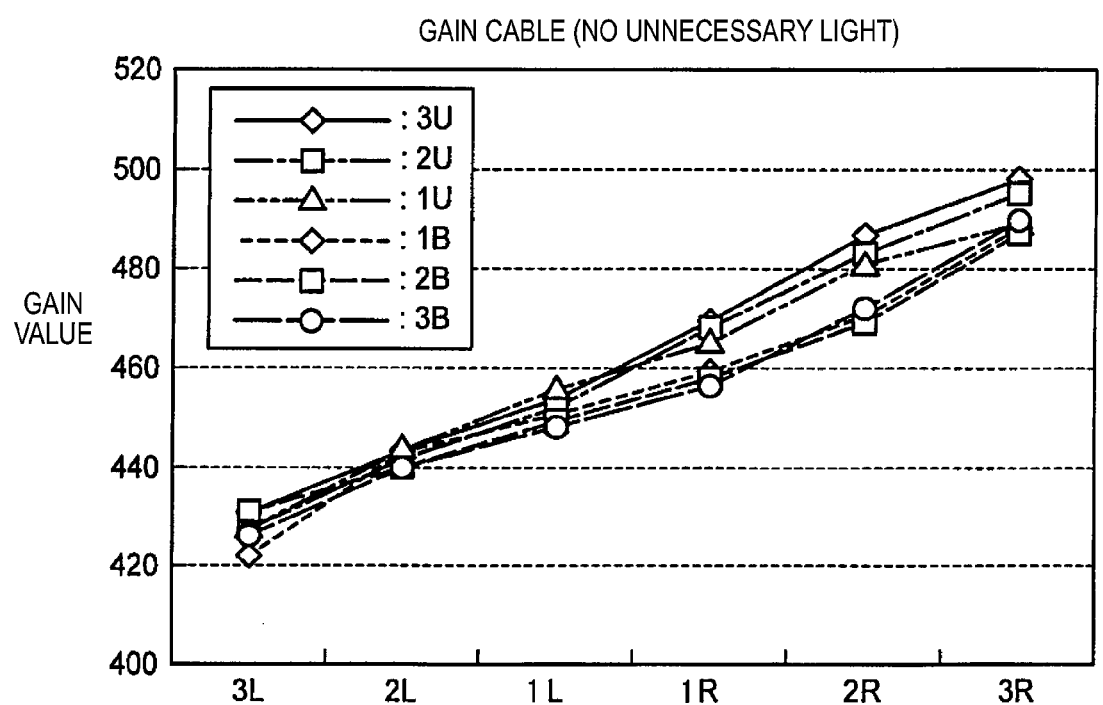
FIG. 5 is a view illustrating an example of a gain table generated by the digital signal processing unit 17 illustrated in FIG. 1 as a graph.
Figure 6:
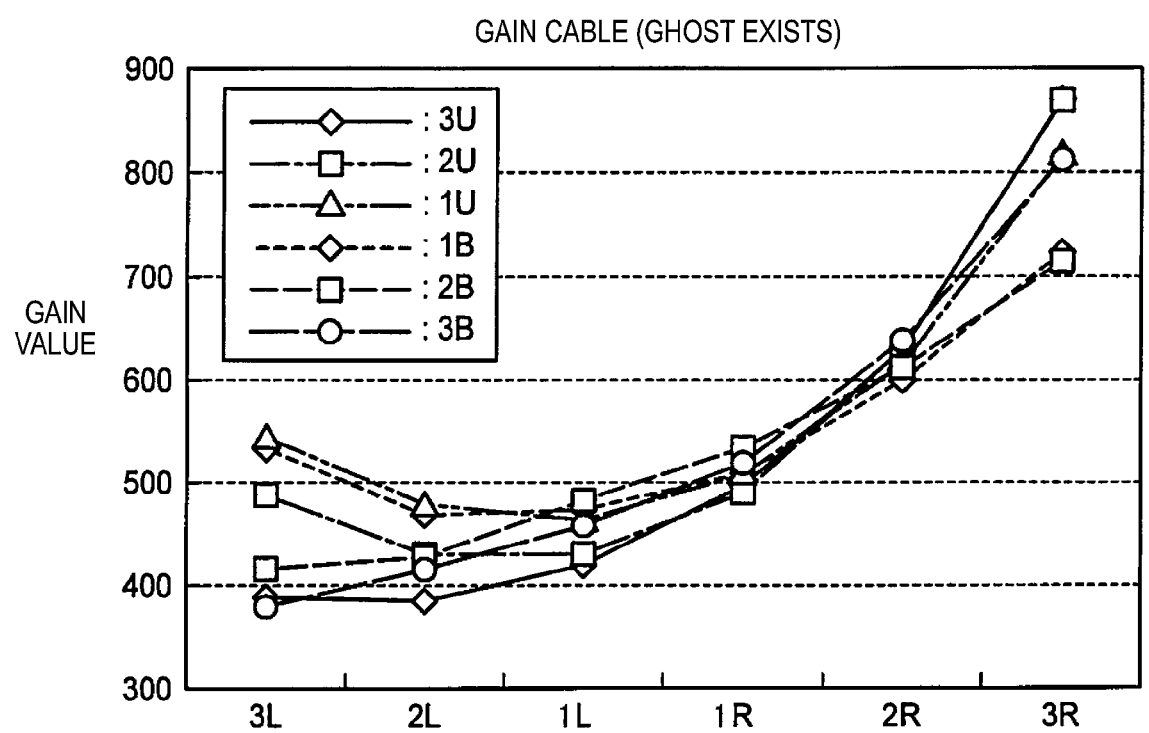
FIG. 6 is a view illustrating an example of a gain table generated by the digital signal processing unit 17 illustrated in FIG. 1 as a graph.

FIGS. 5 and 6 are views illustrating an example of the gain value corresponding to the focus detecting pixel cell 31R in 36 blocks illustrated in FIG. 4.

FIG. 5 is an example of a gain table when the captured image signal is not affected by at least one of the ghost and the flare. FIG. 6 is an example of a table when the captured image signal is affected by the ghost. FIG. 6 illustrates a gain table obtained from the captured image signal when light which causes the ghost is incident in the columns 3L, 2L, and 3R of FIG. 4.

As illustrated in FIG. 5, when at least one of the ghost and the flare is not generated at the time of imaging, a line connecting gain values corresponding to six blocks in the same row may be substantially a rightwardly rising straight line. Further, a width (a difference between a minimum value and a maximum value) of the gain values corresponding to six blocks in the same column is decreased. As described above, the reason why the line connecting the gain values rightwardly rises is as follows.

Figure 7:
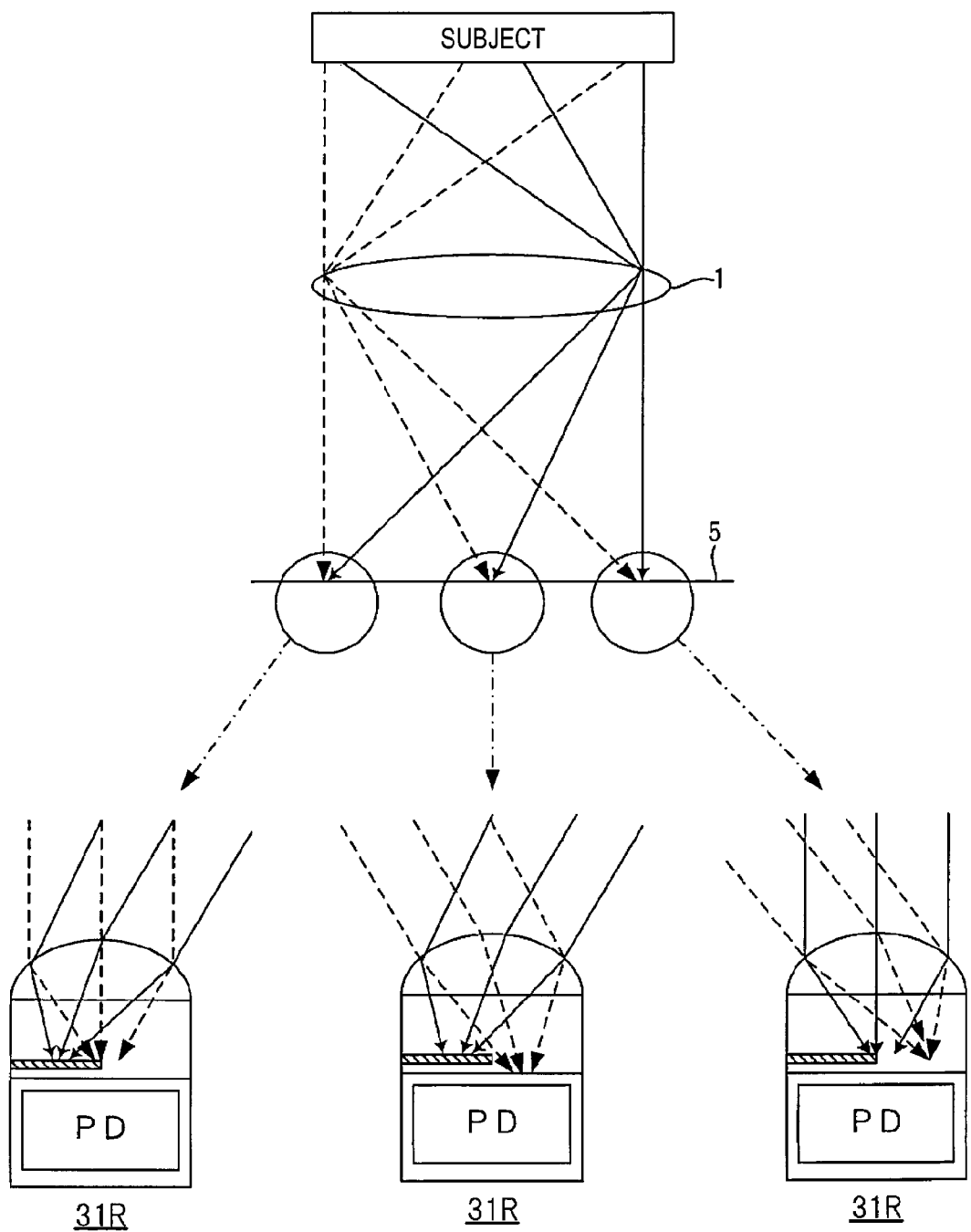
FIG. 7 is a view for explaining a difference of sensitivities in accordance with positions of a phase difference detecting pixel.

An opening of the phase difference detecting pixel 31R is off-centered to a right side in FIG. 2. Therefore, as illustrated in FIG. 7, approximately half of light which passes through the left side of the photographing lens 1 enters into the opening of the phase difference detecting pixel 31R which is located at a left edge of the solid-state imaging element 5, but light which passes through a right side of the photographing lens 1 does not enter thereinto. In contrast, approximately half of light which passes through the right side of the photographing lens 1 enters into the opening of the focus detecting pixel 31R which is located at a right edge of the solid-state imaging element 5 but all light which passes through a right side of the photographing lens 1 enters thereinto. Further, only light which passes through the left side of the photographing lens 1 enters into the opening of the focus detecting pixel 31R which is located at a center of the solid-state imaging element 5, but light which passes through the right side of the photographing lens 1 does not enter thereinto.

As described above, the sensitivity of the focus detecting pixel 31R is increased toward the right edge from the left edge of the solid-state imaging element 5. Therefore, the gain value is also increased toward the column 3R from the column 3L.

As illustrated in FIG. 6, when the ghost is generated at the time of imaging, the line connecting the gain values corresponding to six blocks in the same row is a curve of which bottom part is substantially convex, and the widths of the gain values corresponding to six blocks in the same column are increased in the columns 3L and 3R of an edge of the region A.

As described above, the gain table to be generated varies depending on whether there is at least one of the ghost and the flare. By using this, the digital signal processing unit 17 determines whether there is at least one of the ghost and the flare using the generated gain table.

Hereinafter, a specific example of a method of determining whether there is at least one of the ghost and the flare using the gain table will be described.

FIG. 8 is a view illustrating an adjacent gain value difference table generated from the gain table illustrated in FIG. 5. FIG. 9 is a view illustrating an adjacent gain value difference table generated from the gain table illustrated in FIG. 6.

The adjacent gain value difference table is obtained by calculating a difference between a gain corresponding to an arbitrary block and a gain value corresponding to a block adjacent to the arbitrary block in a direction (a right direction in the row direction X in the case of the solid-state imaging element 5) where a pair of image signals detected by the focus detecting pixel cells 31R and 31L are off-centered.

In FIGS. 8 and 9, a numerical symbol "-##" indicates a difference (a value obtained by subtracting a gain value of a block in the column  from a gain value in a block of a column ##) between a gain value in a column  and a gain value of a block in the same column in a column ## which is adjacent to the column  in a right direction.

Numerical values in the adjacent gain value difference table illustrated in FIGS. 8 and 9 indicate an amount of changed gain value in the region A. When at least one of the ghost and the flare is not generated, the changed amount is reduced as illustrated in FIG. 5, and when the ghost is generated, the changed amount is increased as illustrated in FIG. 6. By using this, the digital signal processing unit 17 calculates a difference between a maximum value and a minimum value among the numerical values in the adjacent gain value difference table.

In the adjacent gain difference table illustrated in FIG. 8, the maximum value among the numerical values is 22 and the minimum value is 7 so that the difference therebetween is 15.

In the adjacent gain value difference table illustrated in FIG. 9, the maximum value among the numerical values is 245 and the minimum value is −67 so that the difference therebetween is 312.

When a threshold value of the difference between the maximum value and the minimum value among the numerical values in the adjacent gain value difference table is set to 20, the captured image signal which is a source of generating the gain table illustrated in FIG. 5 is determined to have no region which is affected by at least one of the ghost and the flare, and the captured image signal which is a source of generating the gain table of FIG. 6 is determined to have a region which is affected by at least one of the ghost and the flare.

The difference between the maximum value and the minimum value among the numerical values in the adjacent gain value difference table when at least one of the ghost and the flare is not generated and the difference between the maximum value and the minimum value among the numerical values in the adjacent gain value difference table when at least one of the ghost and the flare is generated could be experimentally obtained in advance so that an appropriate value may be determined as the threshold value for every digital camera.

In the meantime, when at least one of the ghost and the flare is generated, the digital signal processing unit 17 may determine whether at least one of the ghost and the flare is generated using a property that a difference between a maximum value and a minimum value of the six blocks in the same column is increased as compared with the case where at least one of the ghost and the flare is not generated, as follows.

That is, in the gain table illustrated in FIG. 5 or 6, when there is a column in which the difference between the maximum value and the minimum value among the numerical values in the same column exceeds a predetermined value, the digital signal processing unit 17 determines that the captured images signal which is a source of generating the gain table has a region which is affected by at least one of the ghost and the flare. Further, when there is no column in which the difference between the maximum value and the minimum value among the numerical values in the same column exceeds a predetermined value, the digital signal processing unit 17 determines that the captured images signal which is a source of generating the gain table does not have a region which is affected by at least one of the ghost and the flare.

According to this determining method, an arithmetic operation amount may be reduced so that low power consumption and higher speed correction processing may be achieved.

After a method which determines whether there is at least one of the ghost and the flare based on the difference between the maximum value and the minimum value among the numerical values in the adjacent gain value difference table and a method which determines whether there is at least one of the ghost and the flare based on the difference between the maximum value and the minimum value in the same column in the gain table are individually performed, it may be finally determined whether the captured image signal has a region which is affected by at least one of the ghost and the flare using a result of determining that there is a region affected by at least one of the ghost and the flare from both determinations. As described above, two determining methods are combined so that precision for determining whether there is at least one of the ghost and the flare may be improved.

Figure 10:
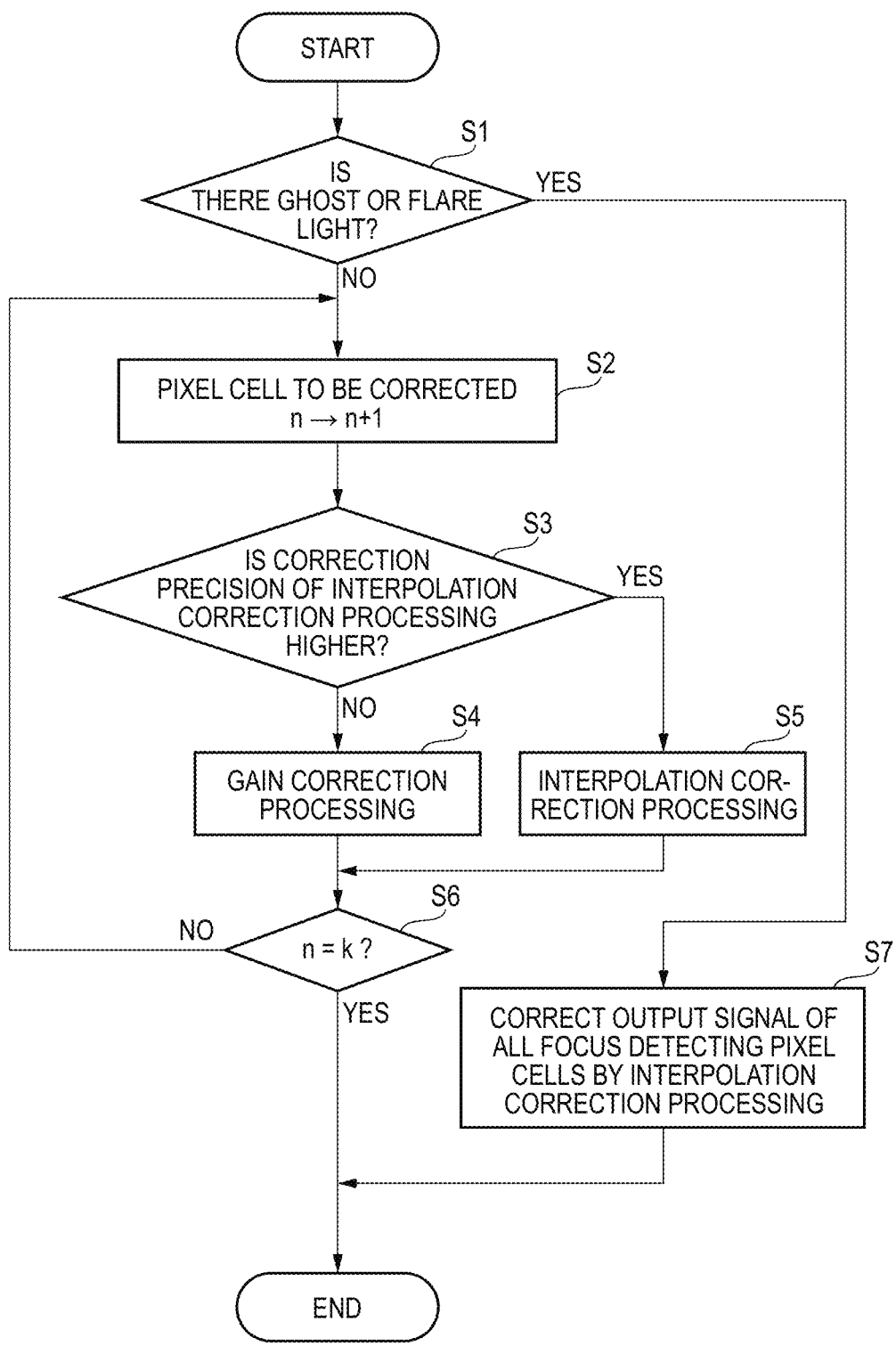
FIG. 10 is a flowchart explaining an operation in a digital camera illustrated in FIG. 1 when an output signal of all focus detecting pixel cell which is included in a captured image signal output from the solid-state imaging element 5 is corrected.

FIG. 10 is a flowchart explaining an operation in the digital camera illustrated in FIG. 1 when an output signal of all focus detecting pixel cell which is included in a captured image signal output from the solid-state imaging element 5 is corrected.

When the solid-state imaging element 5 performs imaging and a captured image signal is stored in a main memory 16, the digital signal processing unit 17 calculates the above-described gain table using the captured image signal and determines whether the captured image signal has a region affected by at least one of the ghost and the flare in step S1 using the gain table.

When it is determined that the captured image signal has a region affected by at least one of the ghost and the flare (Yes in step S1), the digital signal processing unit 17 corrects output signals of all focus detecting pixel cells included in the captured image signal output from the solid-state imaging element 5 by an interpolation correction processing in step S7 and ends the correction processing.

When it is determined that the captured image signal does not have a region affected by at least one of the ghost and the flare (No in step S1), the digital signal processing unit 17 updates a number n (an initial value is zero) of a focus detecting pixel to be corrected to n+1 in step S2.

Next, the digital signal processing unit 17 determines which of a correction precision when the interpolation correction processing is performed and a correction precision when the gain correction processing is performed is higher on the focus detecting pixel cell to be corrected in step S3.

For example, the digital signal processing unit 17 determines whether there is an edge of the subject or a high frequency shape around the focus detecting pixel cell using the output signal of the imaging pixel cell around the focus detecting pixel cell to be corrected.

When it is determined that there is the edge or the high frequency shape, the digital signal processing unit 17 determines that the correction precision of the gain correction processing is high, and when it is determined that there is no edge or high frequency shape, the digital signal processing unit 17 determines that the correction precision of the interpolation correction processing is high.

Alternatively, when a gain value on the gain table corresponding to the focus detecting pixel cell to be corrected is larger than a predetermined value, if the gain correction processing is performed, the noise is increased so that the digital signal processing unit 17 determines that the correction precision of the gain correction processing is high. In the meantime, a known method may be used to determine the correction precision.

When it is determined that a correction precision in the gain correction processing is high (No in step S3), the digital signal processing unit 17 corrects an output signal of the focus detecting pixel cell to be corrected by the gain correction processing based on the gain table generated in the determination of step S1, in step S4.

In contrast, when it is determined that a correction precision in the interpolation correction processing is high (Yes in step S3), the digital signal processing unit 17 corrects the output signal of the focus detecting pixel cell to be corrected by the interpolation correction processing in step S5.

After steps S4 and S5, when the number n of the focus detecting pixel cell to be corrected reaches a total number k of the output signals of the focus detecting pixel cells included in the captured image signal (Yes in step S6), the digital signal processing unit 17 ends the processing and when the number n does not reach the total number k (No in step S6), the digital signal processing unit 17 returns the processing to step S2.

As described above, the digital camera illustrated in FIG. 1 determines whether the captured image signal has a region which is affected by at least one of the ghost and the flare, and if it is determined that the captured image signal has a region which is affected by at least one of the ghost and the flare, the digital camera illustrated in FIG. 1 corrects output signals of all the focus detecting pixel cells by the interpolation correction processing, and if it is determined that the captured image signal does not have a region which is affected by at least one of the ghost and the flare, the digital camera corrects an output signals of each of the focus detecting pixel cells by the correction processing which has a relatively higher correction precision.

As described above, when at least one of the ghost and the flare is generated, the output signal of each of the focus detecting pixel cell are corrected by the interpolation correction processing so that image qualities in the region affected by at least one of the ghosts and the flare and in the region which is not affected by at least one of the ghost and the flare are prevented from being significantly changed in the captured image signal after being corrected so that a captured image quality may be improved.

In the meantime, in the flowchart of FIG. 10, processing of steps S2 to S6 are omitted and when No is selected in step S1, the digital signal processing unit 17 may perform the interpolation correction processing or the gain correction processing for all focus detecting pixel cells.

For example, when a gain value is equal to or larger than a threshold value, the image quality is deteriorated due to increased noises after the correction. Therefore, in the gain table, the number of gain values which exceed the threshold value exceeds a predetermined number, the digital signal processing unit 17 performs the interpolation correction processing on all the focus detecting pixel cells. When the number of gain values that exceed the threshold value is equal to or smaller than the predetermined number, the digital signal processing unit 17 performs the gain correction processing on all the focus detecting pixel cells. That is, the digital signal processing unit 17 selects a correction processing by which the correction error is decreased by the correction for the entire captured image signal to perform the correction processing.

As described above, when at least one of the ghost and the flare is not generated, a correction processing which is optimal to improve the image quality may be selected between the interpolation correction processing and the gain correction processing to be performed so that an image quality when at least one of the ghost and the flare is not generated may be also improved.

However, a method that determining whether there is a region affected by at least one of the ghost or the flare is not limited to the above-described method. For example, methods disclosed in Patent Literatures 2 and 3 may be employed. Further, the determination may be performed by the following method.

(Modified Example of Method which Determines Whether there is a Region Affected by at Least One of Ghost and Flare)

In this modified example, under a condition that at least one of the ghost and the flare is not generated, a reference block gain value which is a gain value for every block calculated using a reference image signal which is obtained by imaging a reference image by the solid-state imaging element 5 is stored in a main memory in advance.

The digital signal processing unit 17 calculates a reference-imaging gain value difference which is a difference between the reference block gain and an imaging block gain value which is a gain value for every block calculated using the captured image signal obtained by imaging a subject by the solid-state imaging element 5.

The digital signal processing unit 17 calculates a difference of the reference-imaging gain value difference calculated for two adjacent blocks in a direction where image signals detected by a pair of focus detecting pixel cells are off-centered and determines that the captured image signal has a region affected by at least one of the ghost and the flare when a difference between a maximum value and a minimum value of the difference exceeds a predetermined value.

Figure 11:
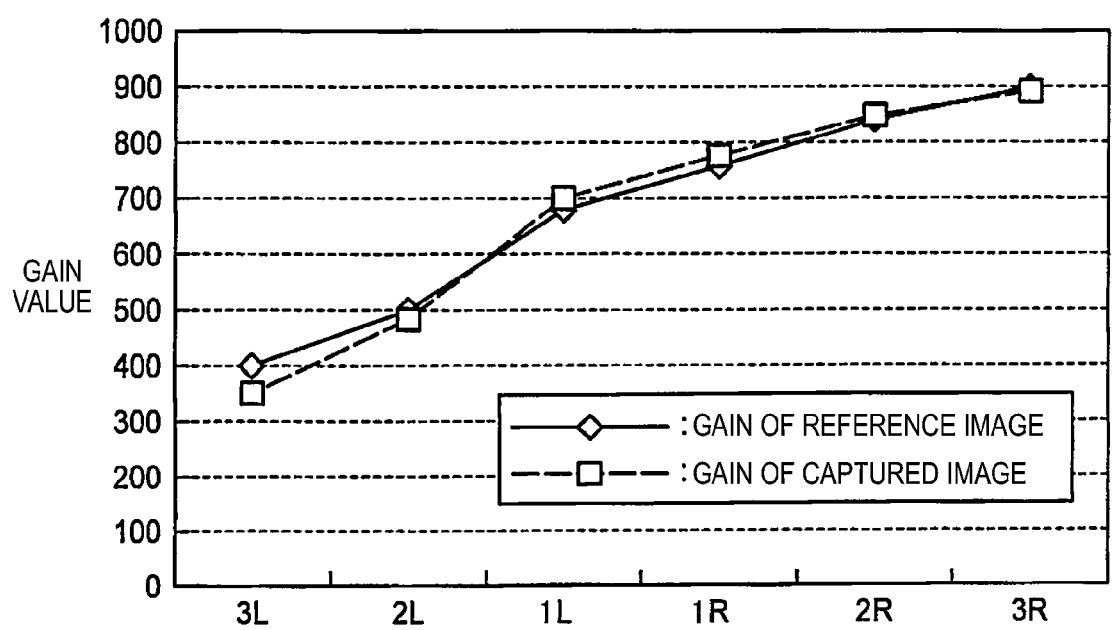
FIG. 11 is a view for explaining a modified example of processing contents of the digital signal processing unit 17 illustrated in FIG. 1.

FIG. 11 is a view illustrating a result of calculating gain values for six blocks in an arbitrary row in a region A illustrated in FIG. 4. A gain value (a gain of the reference image) calculated using a reference captured image signal obtained by imaging a reference image (a monochromic solid image such as a gray image, a white image, an image having the same color as a detected color of a phase difference pixel) by the solid-state imaging element 5 and a gain value (a gain of the captured image) calculated using a captured image signal obtained by imaging a subject by the solid-state imaging element 5 are represented in FIG. 11.

FIG. 12A is a table illustrating a gain of the captured image illustrated in FIG. 11 and FIG. 12B is a table illustrating a gain of the reference image illustrated in FIG. 11. Further, FIG. 12C is a view illustrating a value (reference-captured gain value difference) obtained by subtracting the gain value of each block illustrated in FIG. 12B from the gain values of each block illustrated in FIG. 12A.

The table illustrated in FIG. 12B is stored in a main memory 16 in advance.

The digital signal processing unit 17 calculates data of FIG. 12C from data of FIG. 12A and data of FIG. 12B. The digital signal processing unit 17 generates a table illustrated in FIG. 12D by calculating a difference between the reference-imaging gain value difference corresponding to an arbitrary block and the reference-imaging gain value difference corresponding to a block adjacent to the arbitrary block in a direction (a right direction in the row direction X in the case of the solid-state imaging element 5) where a pair of image signals detected by the focus detecting pixel cells 31R and 31L are off-centered.

In FIG. 12D, a numerical symbol "-##" indicates a difference (a value obtained by subtracting a reference-imaging gain value difference of a block in the column  from a reference-imaging gain value difference in a block of a column ##) between a reference-imaging gain value difference in a column  and a reference-imaging gain value difference of a block in the same row in a column ## which is adjacent to the column  in a right direction.

The digital signal processing unit 17 generates data illustrated in FIG. 12D for every row illustrated in FIG. 4 and calculates a difference between a maximum value and a minimum value in the generated data. When the difference exceeds a predetermined threshold value, the digital signal processing unit 17 determines that there is a region affected by at least one of the ghost and the flare and when the difference is equal to or smaller than the predetermined threshold value, the digital signal processing unit 17 determines that there is no region affected by at least one of the ghost and the flare.

As described above, it is determined whether there is a region affected by at least one of the ghost and the flare by the gain table for the reference image and variation of the difference of gain values of the gain table for the captured image so that a threshold value which is used to determine a region which is affected by at least one of the ghost and the flare may be uniformly set for all solid-state imaging elements 5 so that a manufacturing cost for a digital camera may be saved.

Until now, it is determined whether the captured image signal has a region affected by at least one of the ghost and the flare and when it is determined that the captured image signal has a region affected by at least one of the ghost and the flare, the interpolation correction processing is performed on all the focus detecting pixel cells.

However, when it is possible to determine a position in the captured image signal of the region which is affected by at least one of the ghost and the flare, the interpolation correction processing is performed only on the region which is affected by at least one of the ghost and the flare and correction processing having a higher correction precision is performed on the other region so that the captured image quality may be further improved.

The position in the captured image signal of the region which is affected by at least one of the ghost and the flare may be determined as follows.

First Determination Example

A digital signal processing unit 17 calculates an average of differences between a gain value of an arbitrary block and a gain value of a block adjacent to the arbitrary block in a direction (a column direction Y in FIG. 4) perpendicular to a direction where two image signals detected by a pair of focus detecting pixel cells are off-centered, in a gain table generated using a captured image signal obtained by imaging a subject by a solid-state imaging element 5. Further, an output signal of a focus detecting pixel cell in a block where the average exceeds a predetermined value is determined as a region affected by at least one of the ghost and the flare.

For example, it is assumed that the gain table generated using the captured image signal obtained by imaging a subject by the solid-state imaging element 5 is a table illustrated in FIG. 13A. In this case, the digital signal processing unit 17 calculates a difference between the gain value of each block and a gain value of a block adjacent to the block in upper and lower direction (upper or lower direction of a block which is at the end) to calculate an average of the differences.

Specifically, a gain value of a block at an intersection of a row 1U and a column 2L is 800 and each of gain values of the blocks in upper and lower direction of the block is 450. Therefore, the digital signal processing unit 17 considers a value, 350, which is obtained by an arithmetic operation of $\{(800-450)+(800-450)\}/2$ as a value in the block. A result of performing the arithmetic operation on each block is illustrated in FIG. 13B.

As it is understood when comparing FIGS. 5 and 6, when at least one of the ghost and the flare is generated, a difference of gain values between adjacent blocks in the column direction Y is increased. Therefore, the digital signal processing unit 17 sets a threshold value for data illustrated in FIG. 13B and determines that the block where the gain value is equal to or larger than the threshold value is affected by at least one of the ghost and the flare and the block where the gain value is smaller than the threshold value is not affected by at least one of the ghost and the flare.

For example, when the threshold value is set to be 100 in FIG. 13B, a hatched block is determined as a block which is affected by at least one of the ghost and the flare.

Second Determination Example

A gain table is generated using a reference image signal obtained by imaging a reference image under a condition that at least one of the ghost and the flare is not generated, and stored in a main memory 16. The digital signal processing unit 17 subtracts a gain value of each block of a gain table illustrated in FIG. 14B which is generated using the reference captured image signal from a gain value of each block of a gain table illustrated in FIG. 14A which is generated using a captured image signal to generate a table illustrated in FIG. 14C.

In the block which is affected by at least one of the ghost and the flare, a difference between a gain value generated using a reference captured image signal and a gain value generated using a captured image signal is increased. Therefore, in the table illustrated in FIGS. 14A to 14C, the digital signal processing unit 17 determines that a block where a gain value is equal to or larger than a predetermined threshold value is affected by at least one of the ghost and the flare and the block where the gain value is smaller than the threshold value is not affected by at least one of the ghost and the flare.

For example, when the threshold value is set to be 100 in FIG. 14C, a hatched block is determined as a block which is affected by at least one of the ghost and the flare.

By the first determination example and the second determination example, it is possible to determine whether the captured image signal has a region affected by at least one of the ghost and the flare and a position of the region.

The digital signal processing unit 17 determines whether the captured image signal has a region affected by at least one of the ghost, by the first determination example and the second determination example. When it is determined that there is a region affected by at least one of the ghost, the digital signal processing unit 17 corrects the output signal of the focus detecting pixel cell included in the region by the interpolation correction processing and performs correction processing having a higher correction precision on the output signal of the focus detecting pixel cell included in the other region. Further, when it is determined that there is no region affected by at least one of the ghost, the digital signal processing unit 17 performs processing after step S2 of FIG. 10.

By doing this, in the corrected captured image signal, it is possible to prevent image qualities between the region affected by at least one of the ghost and the flare and the other region from being significantly varied, thereby improving a captured image quality.

Next, descriptions will be made on a configuration of a smart phone as an imaging device.

Figure 15:
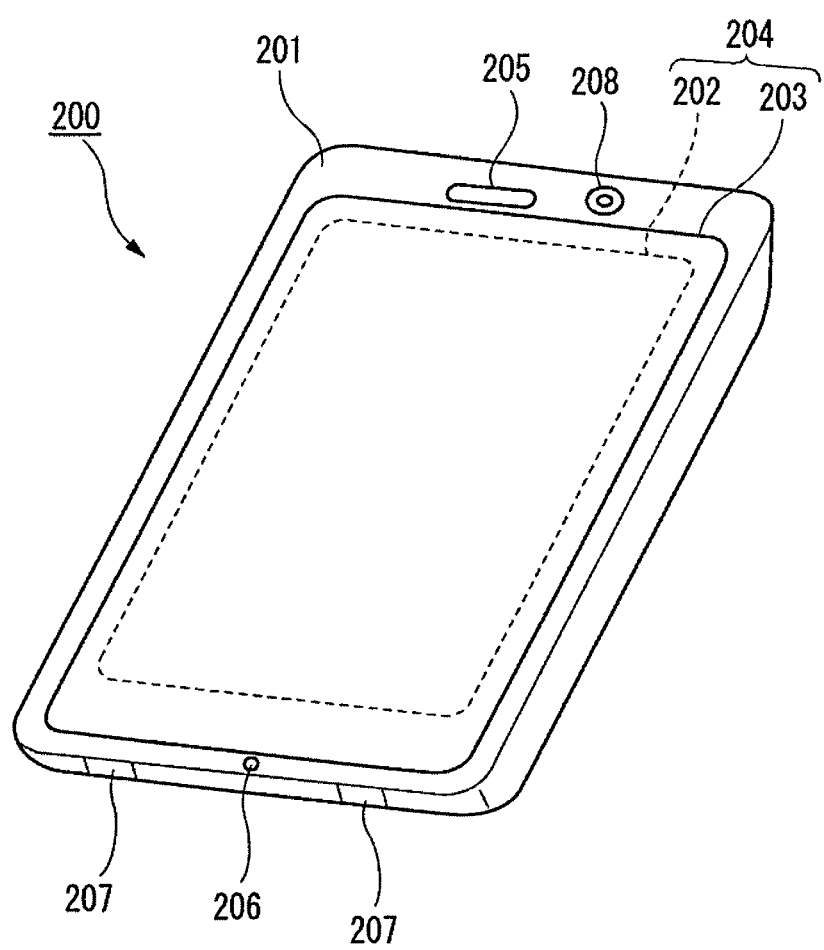
FIG. 15 is a view illustrating explaining a smart phone as an imaging device.

FIG. 15 illustrates an outer appearance of a smart phone 200 which is an embodiment of the imaging device of the present invention. The smart phone 200 illustrated in FIG. 15 includes a flat panel type housing 201 and is provided, on one surface of the housing 201, with a display input unit 204 in which a display panel 202 as a display unit and an operating panel 203 as an input unit are integrally formed. In addition, the housing 201 includes a speaker 205, a microphone 206, an operating unit 207, and a camera 208. However, the configuration of the housing 201 is not limited thereto. For example, a configuration in which the display unit and the input unit are independent from each other may be employed or a configuration having a folding structure or a slide mechanism may be employed.

Figure 16:
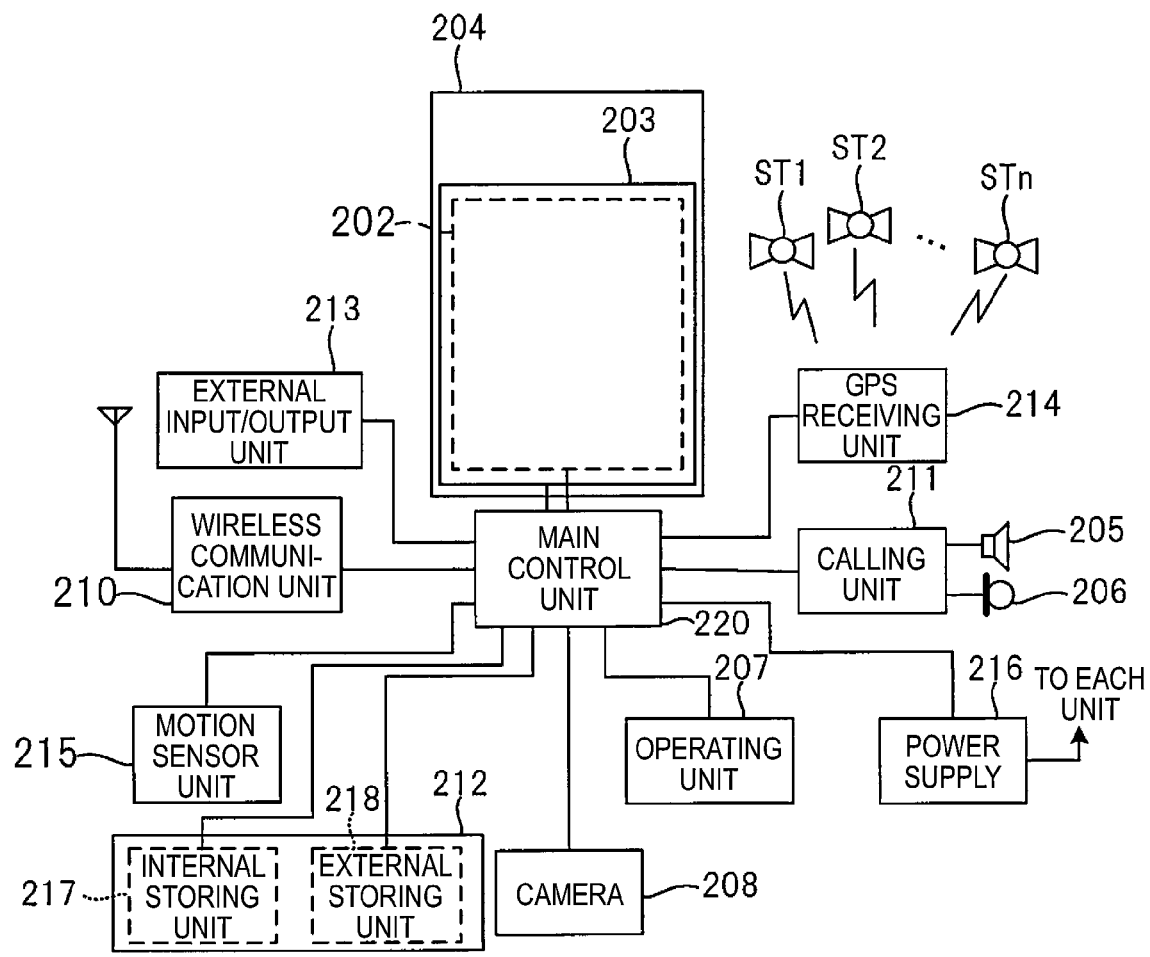
FIG. 16 is an internal block diagram of the smart phone of FIG. 15.

FIG. 16 is a block diagram illustrating a configuration of the smart phone 200 illustrated in FIG. 15. As illustrated in FIG. 16, as main components, the smart phone includes a wireless communication unit 210, a display input unit 204, a calling unit 211, an operating unit 207, a camera 208, a storing unit 212, an external input/output unit 213, a global positioning system (GPS) receiving unit 214, a motion sensor unit 215, a power supply 216, and a main control unit 220. Further, as a main function of the smart phone 200, the smart phone 200 is provided with a wireless communication function which performs mobile wireless communication through a base station device BS which is not illustrated and a mobile communication network NW which is not illustrated.

The wireless communication unit 210 performs wireless communication with the base station device BS which is accommodated in the mobile communication network NW in accordance with an instruction of the main control unit 220. Using the wireless communication, the wireless communication unit 210 transmits/receives various file data such as voice data and image data and electronic mail data or receives web data, streaming data, or the like.

The display input unit 204 is provided with a display panel 202 and an operating panel 203 as a so-called touch panel which displays an image (a still image or a moving picture) or text information under the control of the main control unit 220 so as to visually deliver information to a user, and detects the user's operation on displayed information.

The display panel 202 uses a liquid crystal display (LCD), an organic electroluminescence display (OELD), or the like, as a display device.

The operating panel 203 is a device which is disposed to allow an image displayed on a display surface of the display panel 202 to be visually recognized and detects one or a plurality of coordinates which can be operated by a finger of the user or a stylus. When the device is operated by the finger of the user or the stylus, a detection signal which is generated based on the operation is output to the main control unit 220. Subsequently, the main control unit 220 detects an operating position (coordinates) on the display panel 202, based on the received detection signal.

As illustrated in FIG. 15, although the display panel 202 and the operating panel 203 of the smart phone 200 exemplified as an embodiment of the imaging device of the present invention are integrally formed with each other to constitute the display input unit 204, the operating panel 203 may be disposed to completely cover the display panel 202.

When such an arrangement is employed, the operating panel 203 may be provided with a function of detecting the user's operation on a region other than the display panel 202. In other words, the operating panel 203 may include a detection region (hereinafter, referred to as a "display region") on an overlapping portion which overlaps the display panel 202 and a detection region (hereinafter, referred to as a "non-display region") for other outer peripheral portion which does not overlap the display panel 202.

In the meantime, although the size of the display region and the size of the display panel 202 may completely coincide with each other, both sizes do not necessarily coincide with each other. In addition, the operating panel 203 may include two sensitive regions of an outer peripheral portion and an inner portion other than the outer peripheral portion. Moreover, a width of the outer peripheral portion is appropriately designed in accordance with the size of the housing 201. Moreover, as a position detecting system employed in the operating panel 203, a matrix switch system, a resistive layer system, a surface elastic wave system, an infrared system, an electromagnetic induction system, or an electrostatic capacitive system may be exemplified, and any system may be employed.

The calling unit 211 includes the speaker 205 or the microphone 206 and converts the user's voice input through the microphone 206 into voice data to be processed by the main control unit 220 and outputs the converted voice data to the main control unit 220, or decodes voice data received by the wireless communication unit 210 or the external input/output unit 213 and outputs the decoded voice data from the speaker 205. Furthermore, as illustrated in FIG. 15, for example, the speaker 205 may be mounted on the same surface as the surface provided with the display input unit 204 and the microphone 206 may be mounted on a side surface of the housing 201.

The operating unit 207 is a hardware key which uses a key switch and receives an instruction from the user. For example, as illustrated in FIG. 15, the operating unit 207 is a push button type switch which is mounted on a side surface of the housing 201 of the smart phone 200 and turned on when the operating unit 207 is pressed by a finger and turned off by restoring force of a spring when the finger is detached.

The storing unit 212 stores a control program or control data of the main control unit 220, application software, address data to which names, phone numbers, or the like of communication counterparts are correlated, transmitted/received electronic mail data, web data downloaded by web browsing or downloaded content data, and temporarily stores streaming data. Further, the storing unit 212 is configured by an internal storing unit 217 which is mounted in the smart phone and an external storing unit 218 which includes a detachable external memory slot. Furthermore, the internal storing unit 217 and the external storing unit 218 which configure the storing unit 212 are implemented by using a storing medium such as a flash memory type memory, hard disk type memory, multimedia card micro type memory, card type memory (for example, MicroSD (registered trademark) memory), a random access memory (RAM), or a read only memory (ROM).

The external input/output unit 213 functions as an interface with all external devices which are connected to the smart phone 200 and is configured to be directly or indirectly connected to any other external device by communication (for example, universal serial bus (USB) or IEEE1394) or a network (for example, Internet, wireless LAN, Bluetooth (registered trademark), a radio frequency identification (RFID), an infrared data association (IrDA (registered trademark)), ultra wideband (UWB: registered trademark), or a ZigBee (registered trademark).

As external devices connected to the smart phone 200, a wired/wireless head set, a wired/wireless external charger, a wired/wireless data port, a memory card or a SIM (subscriber identity module) card/UIM (user identity module) card connected through a card socket, an external audio/video device connected through an audio/video input/output (I/O) terminal, a wirelessly connected external audio/video device, a wiredly/wirelessly connected smart phone, a wiredly/wirelessly connected personal computer, a wiredly/wirelessly connected PDA, a wiredly/wirelessly connected personal computer, or an earphone may be exemplified. The external input/output unit 213 may transmit data which is received from such external devices to individual components in the smart phone 200 and may also allow the data in the smart phone 200 to be transmitted to an external device.

The GPS receiving unit 214 receives GPS signals which are transmitted from GPS satellites ST1 to STn according to an instruction from the main control unit 220 and performs position measurement operation processing based on the received GPS signals to detect positions including latitude, longitude, and height of the smart phone 200. When the GPS receiving unit 214 may obtain positional information from the wireless communication unit 210 or the external input/output unit 213 (for example, the wireless LAN), the GPS receiving unit 214 may detect a position using that positional information.

The motion sensor unit 215 includes, for example, a three axis acceleration sensor and detects physical movement of the smart phone 200 according to the instruction of the main control unit 220. When the physical movement of the smart phone 200 is detected, the movement direction or acceleration of the smart phone 200 is detected. The detected result is output to the main control unit 220.

The power supply 216 supplies power which is accumulated in a battery (not illustrated) to individual units of the smart phone 200 according to the instruction of the main control unit 220.

The main control unit 220 includes a microprocessor and operates according to a control program or control data stored in the storing unit 212 and collectively controls individual units of the smart phone 200. Further, the main control unit 220 is provided with a mobile communication control function which controls individual units of a communication system and an application processing function to control individual units of a communication system in order to perform voice communication or data communication through the wireless communication unit 210.

The application processing function is implemented when the main control unit 220 is operated according to the application software which is stored in the storing unit 212. The application processing function includes, for example, an infrared communication function which performs data communication with a counterpart device by controlling the external input/output unit 213, an electronic mail function which transmits/receives an electronic mail, and a web browsing function which browses a web page.

The main control unit 220 is provided with an image processing function which displays an image on the display input unit 204 based on the image data (still image or moving picture data) such as received data or downloaded streaming data. The image processing function refers to a function of decoding the image data and performing image processing on the decoded result to display the image on the display input unit 204 by the main control unit 220.

The main control unit 220 executes display control of the display panel 202 and an operation detection control which detects a user's operation through the operating unit 207 and the operating panel 203. By executing the display control, the main control unit 220 displays an icon to activate application software or a software key such as a scroll bar or displays a window for preparing an electronic mail. Here, the scroll bar refers to a software key for receiving an instruction to move a displayed portion of an image with respect to a large image which cannot enter into the display region of the display panel 202.

When the operation detection control is executed, the main control unit 220 detects the user's operation through the operating unit 207 or receives an operation on the icon or the input of a character string into an input column of the window through the operating panel 203 or receives a scroll request of a displayed image through the scroll bar.

By executing the operation detection control, the main control unit 220 determines whether the operating position of the operating panel 203 is an overlapping portion (display region) which overlaps the display panel 202 or an outer peripheral portion (non-display region) which does not overlap the display panel 202 other than the overlapping portion, and is provided with a touch panel control function that controls a sensitive region of the operating panel 203 or a display position of the software key.

The main control unit 220 may detects a gesture operation with respect to the operating panel 203 and execute a predetermined function according to the detected gesture operation. The gesture operation refers to an operation which draws a trace using a finger, designates a plurality of positions simultaneously, or a combination thereof to draw a trace for at least one from the plurality of positions, rather than a simple touch operation of the related art.

The camera 208 includes a configuration other than the external memory control unit 20, the recording medium 21, the display control unit 22, the display unit 23, and the operating unit 14 in the digital camera which is illustrated in FIG. 1. Captured image data which is generated by the camera 208 may be stored in the storing unit 212 or output through the external input/output unit 213 or the wireless communication unit 210. As illustrated in FIG. 15, although the camera 208 is mounted on the same surface as the display input unit 204 in the smart phone 200, the mounting position of the camera 208 is not limited thereto and the camera 208 may be mounted on a rear surface of the display input unit 204.

The camera 208 may be used for various functions of the smart phone 200. For example, an image which is obtained by the camera 208 may be displayed on the display panel 202, or the image of the camera 208 may be used as one of operation inputs of the operating panel 203. Further, when the GPS receiving unit 214 detects the position, the position may be detected with reference to the image from the camera 208. Moreover, an optical axis direction of the camera 208 of the smart phone 200 may be determined or a current usage environment may also be determined with reference to the image from the camera 208 either without using the 3-axis acceleration sensor or using the 3-axis acceleration sensor. Of course, the image from the camera 208 can be used in the application software.

Positional information obtained by the GPS receiving unit 214, voice information obtained by the microphone 206 (which may be text information obtained by performing a voice-text conversion by the main control unit or the like), or posture information obtained by the motion sensor unit 215 may be added to the image data of a still image or a moving picture to be stored in the storing unit 212 or output through the external input/output unit 213 or the wireless communication unit 210.

The digital signal processing unit 17 performs the above-described signal correction processing so that a high-quality photographing may be achieved also on the smart phone 200 having the above-described configuration.

As described above, the following matters are disclosed herein.

It is disclosed an imaging device including an imaging element which includes a plurality of first pixel cells for imaging and a plurality of pairs configured by plural types of second pixel cells for focus detection which receive light passing through different pupil regions of a photographing lens, the device including: a determining unit which determines whether a captured image signal is affected by at least one of a flare and a ghost using the captured image signal obtained by imaging by the solid-state imaging element; a correction processing unit which performs one of interpolation correction processing and gain correction processing on an output signal of the second pixel cell included in the captured image signal, where the interpolation correction processing corrects the output signal of the second pixel cell by signal interpolation using an output signal of the plurality of first pixel cells around the second pixel included in the captured image signal, and the gain correction processing corrects the output signal of the second pixel cell by multiplying the output signal with a gain value; and an image data generating unit which processes the captured image signal after the correction processing by the correction processing unit to generate captured image data, in which the correction processing unit determines as to whether which one of the interpolation correction processing and the gain correction processing is to be performed on the output signal of the second pixel cell on the basis of a determination result by the determining unit.

It is disclosed the imaging device, in which when it is determined that the captured image signal is not affected by at least one of the flare and the ghost, the correction processing unit performs one of the interpolation correction processing and the gain correction processing on the output signal of the second pixel cell, and when it is determined that the captured image signal is affected by at least one of the flare and the ghost, the correction processing unit performs the interpolation correction processing on the output signal of the second pixel cell.

It is disclosed the imaging device, in which the determining unit determines a region in the captured image signal which is affected by at least one of the flare and the ghost using the captured image signal, the correction processing unit performs the interpolation correction processing on the output signal of the second pixel cell which is included in the region of the captured image signal affected by at least one of the flare and the ghost, and the correction processing unit performs one of the interpolation correction processing and the gain correction processing on the output signal of the second pixel cell which is included in the region of the captured image signal which is not affected by at least one of the flare and the ghost.

It is disclosed the imaging device, in which the determining unit divides a region where the second pixel cells are disposed into a plurality of blocks, the determining unit calculates an imaging block gain value which is a gain value required to correct the output signal of the second pixel cell in each block by the gain correction processing using the captured image signal, and the determining unit determines whether the captured image signal affected by at least one of the flare and the ghost using the imaging block gain value.

It is disclosed the imaging device, in which when a difference between a maximum value and a minimum value of an adjacent block gain difference which is a difference between imaging block gain values calculated for two adjacent blocks in a direction where two image signals detected by the second pixel cells are off-centered exceeds a predetermined value, the determining unit determines that the captured image signal is affected by at least one of the flare and the ghost.

It is disclosed the imaging device, further including: a storing unit which stores a reference block gain value which is a gain value for each block calculated by using a reference captured image signal obtained by imaging a reference image by the solid-state imaging element under a condition that at least one of the flare and the ghost is not generated, in which the determining unit calculates a reference block gain value difference which is a difference between the reference block gain values and the imaging block gain values, and when a difference between a maximum value and a minimum value of the reference block gain value difference calculated for two adjacent blocks in a direction where two image signals detected by the second pixel cells are off-centered exceeds a predetermined value, the determining unit determines that the captured image signal is affected by at least one of the flare and the ghost.

It is disclosed the imaging device, in which the determining unit divides a region where the second pixel cells are disposed into a plurality of blocks, the determining unit calculates an imaging block gain value which is a gain value required to correct the output signal of the second pixel cell in each block by the gain correction processing using the captured image signal, and the determining unit determines a region which is affected by at least one of the flare and the ghost using the imaging block gain value.

It is disclosed the imaging device, in which the determining unit calculates an average of differences between the imaging block gain value and a gain value of blocks adjacent in a direction perpendicular to a direction where two image signals detected by the second pixel cells are off-centered, and the determining unit determines a signal corresponding to a block in which the average exceeds a predetermined value as a region affected by at least one of the flare and the ghost.

It is disclosed the imaging device, further including: a storing unit which stores a reference block gain value which is a gain value for each block calculated by a reference captured image signal obtained by imaging a reference image by the solid-state imaging element under a condition that at least one of the flare and the ghost is not generated, in which the determining region determines a signal corresponding to a block in which a difference between the reference block gain value and the imaging block gain value exceeds a predetermined value as a region affected by at least one of the flare and the ghost.

It is disclosed a signal correcting method which corrects a captured image signal output from an imaging element including a plurality of first pixel cells for imaging and a plurality of pairs configured by plural types of second pixel cells for focus detection which receive light passing through different pupil regions of a photographing lens which are two dimensionally arranged, the method including: a determining step which determines whether a captured image signal is affected by at least one of a flare and a ghost using the captured image signal obtained by imaging by the solid-state imaging element; a correction processing step which performs one of interpolation correction processing and gain correction processing on an output signal of the second pixel cell included in the captured image signal, where the interpolation correction processing corrects the output signal of the second pixel cell by signal interpolation using an output signal of the plurality of first pixel cells around the second pixel included in the captured image signal, and the gain correction processing corrects the output signal of the second pixel cell by multiplying the output signal with a gain value; and an image data generating step which processes the captured image signal after the correction processing by the correction processing step to generate captured image data, in which in the correction processing step, it is determined as to whether which one of the interpolation correction processing and the gain correction processing is to be performed on the output signal of the second pixel cell on the basis of a determination result by the determining step.

According to the present invention, an imaging device and a signal correcting method which does not deteriorate a quality of a captured image obtained by an imaging element including a focus detecting pixel cell and an imaging pixel cell are provided even when a ghost or a flare is generated.

Although the present invention has been described in detail with reference to specific embodiments thereof, it is obvious to those skilled in the art that various changes or modifications may be made without departing from the spirit and scope of the present invention.

The present application is based on Japanese Patent Application (Patent application 2012-108559) filed on May 10, 2012 and Japanese Patent Application (Patent application 2012-251565) filed on Nov. 15, 2012, and the contents of which are incorporated herein by reference.

What is claimed is:

1. An imaging device including an imaging element which includes a plurality of first pixel cells for imaging and a plurality of pairs configured by plural types of second pixel cells for focus detection which receive light passing through different pupil regions of a photographing lens, the device comprising:
a determining unit which determines whether a captured image signal is affected by at least one of a flare and a ghost using the captured image signal obtained by imaging by the solid-state imaging element;
a correction processing unit which performs one of interpolation correction processing and gain correction processing on an output signal of the second pixel cell included in the captured image signal, where the interpolation correction processing corrects the output signal of the second pixel cell by signal interpolation using an output signal of the plurality of first pixel cells around the second pixel included in the captured image signal, and the gain correction processing corrects the output signal of the second pixel cell by multiplying the output signal with a gain value; and
an image data generating unit which processes the captured image signal after the correction processing by the correction processing unit to generate captured image data,
wherein the correction processing unit determines as to whether which one of the interpolation correction processing and the gain correction processing is to be performed on the output signal of the second pixel cell on the basis of a determination result by the determining unit.

2. The imaging device of claim 1, wherein
when it is determined that the captured image signal is not affected by at least one of the flare and the ghost, the correction processing unit performs one of the interpolation correction processing and the gain correction processing on the output signal of the second pixel cell, and
when it is determined that the captured image signal is affected by at least one of the flare and the ghost, the correction processing unit performs the interpolation correction processing on the output signal of the second pixel cell.

3. The imaging device of claim 1, wherein
the determining unit determines a region in the captured image signal which is affected by at least one of the flare and the ghost using the captured image signal,
the correction processing unit performs the interpolation correction processing on the output signal of the second pixel cell which is included in the region of the captured image signal affected by at least one of the flare and the ghost, and
the correction processing unit performs one of the interpolation correction processing and the gain correction processing on the output signal of the second pixel cell which is included in the region of the captured image signal which is not affected by at least one of the flare and the ghost.

4. The imaging device of claim 3, wherein
the determining unit divides a region where the second pixel cells are disposed into a plurality of blocks,
the determining unit calculates an imaging block gain value which is a gain value required to correct the output signal of the second pixel cell in each block by the gain correction processing using the captured image signal, and
the determining unit determines a region which is affected by at least one of the flare and the ghost using the imaging block gain value.

5. The imaging device of claim 4, wherein
the determining unit calculates an average of differences between the imaging block gain value and a gain value of blocks adjacent in a direction perpendicular to a direction where two image signals detected by the second pixel cells are off-centered, and
the determining unit determines a signal corresponding to a block in which the average exceeds a predetermined value as a region affected by at least one of the flare and the ghost.

6. The imaging device of claim 4, further comprising:
a storing unit which stores a reference block gain value which is a gain value for each block calculated by a reference captured image signal obtained by imaging a reference image by the solid-state imaging element under a condition that at least one of the flare and the ghost is not generated, wherein the determining region determines a signal corresponding to a block in which a difference between the reference block gain value and the imaging block gain value exceeds a predetermined value as a region affected by at least one of the flare and the ghost.

7. The imaging device of claim 1, wherein the determining unit divides a region where the second pixel cells are disposed into a plurality of blocks, the determining unit calculates an imaging block gain value which is a gain value required to correct the output signal of the second pixel cell in each block by the gain correction processing using the captured image signal, and the determining unit determines whether the captured image signal affected by at least one of the flare and the ghost using the imaging block gain value.

8. The imaging device of claim 7, wherein when a difference between a maximum value and a minimum value of an adjacent block gain difference which is a difference between imaging block gain values calculated for two adjacent blocks in a direction where two image signals detected by the second pixel cells are off-centered exceeds a predetermined value, the determining unit determines that the captured image signal is affected by at least one of the flare and the ghost.

9. The imaging device of claim 7, further comprising:

a storing unit which stores a reference block gain value which is a gain value for each block calculated by using a reference captured image signal obtained by imaging a reference image by the solid-state imaging element under a condition that at least one of the flare and the ghost is not generated, wherein the determining unit calculates a reference block gain value difference which is a difference between the reference block gain values and the imaging block gain values, and when a difference between a maximum value and a minimum value of the reference block gain value difference calculated for two adjacent blocks in a direction where two image signals detected by the second pixel cells are off-centered exceeds a predetermined value, the determining unit determines that the captured image signal is affected by at least one of the flare and the ghost.

10. A signal correcting method which corrects a captured image signal output from an imaging element including a plurality of first pixel cells for imaging and a plurality of pairs configured by plural types of second pixel cells for focus detection which receive light passing through different pupil regions of a photographing lens which are two dimensionally arranged, the method comprising:

a determining step which determines whether a captured image signal is affected by at least one of a flare and a ghost using the captured image signal obtained by imaging by the solid-state imaging element;

a correction processing step which performs one of interpolation correction processing and gain correction processing on an output signal of the second pixel cell included in the captured image signal, where the interpolation correction processing corrects the output signal of the second pixel cell by signal interpolation using an output signal of the plurality of first pixel cells around the second pixel included in the captured image signal, and the gain correction processing corrects the output signal of the second pixel cell by multiplying the output signal with a gain value; and an image data generating step which processes the captured image signal after the correction processing by the correction processing step to generate captured image data, wherein in the correction processing step, it is determined as to whether which one of the interpolation correction processing and the gain correction processing is to be performed on the output signal of the second pixel cell on the basis of a determination result by the determining step.

* * * * *